Oct. 9, 1956     E. V. BERGSTROM     2,766,187
METHOD AND APPARATUS FOR HYDROCARBON CONVERSION
Filed July 10, 1951     3 Sheets-Sheet 1

INVENTOR.
Eric V. Bergstrom
BY John A. Crowley Jr.
ATTORNEY

Oct. 9, 1956

E. V. BERGSTROM

2,766,187

METHOD AND APPARATUS FOR HYDROCARBON CONVERSION

Filed July 10, 1951

INVENTOR.
Eric V. Bergstrom
BY
John A. Crowley Jr.
ATTORNEY

Oct. 9, 1956  E. V. BERGSTROM  2,766,187
METHOD AND APPARATUS FOR HYDROCARBON CONVERSION
Filed July 10, 1951  3 Sheets-Sheet 3

INVENTOR.
Eric V. Bergstrom
BY
John A. Crowley, Jr.
ATTORNEY

United States Patent Office 2,766,187
Patented Oct. 9, 1956

2,766,187

METHOD AND APPARATUS FOR HYDROCARBON CONVERSION

Eric V. Bergstrom, Short Hills, N. J., assignor to Socony Mobil Oil Company, Inc., a corporation of New York Application July 10, 1951, Serial No. 235,980

8 Claims. (Cl. 196—52)

This invention has to do with a method and apparatus for the conversion of high boiling fluid hydrocarbons to lower boiling hydrocarbons in the presence of a moving granular contact material mass which may or may not exhibit catalytic properties with respect to the hydrocarbon conversion. Particularly, this invention is concerned with a method and apparatus for introduction of a high boiling liquid hydrocarbon charge and contact material granules into the conversion zone of processes wherein the contact material passes cyclically through the conversion zone wherein it is contacted by a liquid or mixed phase high boiling hydrocarbon charge to effect conversion thereof and then through a regenerating or reconditioning zone wherein it is contacted with a suitable gas for reconditioning said contact material to a condition suitable for reuse in said conversion zone.

Typical of processes to which the apparatus herein described may be applied is the catalytic conversion of liquid hydrocarbon to lower boiling, gasoline containing, gaseous products by the contacting of a high boiling liquid charge at temperatures of the order of 850° F. and above with a moving bed of granular adsorbent catalytic material. Other exemplary processes to which this invention may be applied are the thermal visbreaking, coking or cracking of liquid or mixed phase hydrocarbon charge by contact with heated granular inert contact material.

In such processes, wherein the contact material is catalytic in nature, it may partake of the nature of natural or treated clays, bauxite, activated alumina or synthetic associations of silica, alumina, or silica and alumina to which other substances such as certain metallic oxides may be added in small amounts for specific purposes. When the contact material is inert in character it may partake of the form of refractory materials such as zirkite, corhart material, mullite or it may partake of the form of stones or metallic particles or balls. It is desirable to maintain the size of the contact material particles within the range about 3 to 100 mesh and preferably within the range 4 to 20 mesh by Tyler Standard Screen Analysis. This limitation is dictated by the necessity of maintaining a practical capacity for gas flow through the compact mass of contact material in the conversion and regeneration zones and not by any limitation imposed by the apparatus. While operation using contact material of size outside these ranges may be obtained, the resulting operation is inferior.

Before carrying this discussion further, definitions of certain terms used in describing and claiming this invention will be made. The term "gaseous" as used herein is intended to refer to a material in the gaseous phase at the particular operating conditions of temperature and pressure involved regardless of what may be the normal phase of that material under ordinary atmospheric conditions. Similarly, "liquid" is intended to refer to a material in the liquid phase at the particular operating conditions involved regardless of its normal state under atmospheric conditions. The expression "contact material" is employed herein in a broad sense as covering solid particles which are suitable as a contacting or heat carrying agent for the particular conversion involved regardless of whether such solid particles exhibit a catalytic effect toward the conversion or not. The term "granular" is used herein to denote pelleted, tableted, or spherical pieces or pieces of regular or irregular shape and of palpable particulate form as distinguished from powdered material.

In conversion systems wherein the hydrocarbon charge is introduced in liquid or mixed phase and contact material moves in a compact column through the conversion zone, a major problem is the introduction of the liquid charge in such a manner that such liquid will be distributed uniformly over the entire column cross-section within the conversion zone. It has been found that in the usual moving bed system wherein the contact material is delivered directly onto the bed in the conversion zone through a plurality of uniformly spaced conduits, the procedure of simply spraying the liquid charge on the surface of the bed of contact material within the conversion zone results in the concentration of the liquid in the low places on the bed surface with resultant channeling through localized areas of the bed therebelow and very uneven carbonaceous contaminant distribution on the contact material. Further, it is necessary that the hydrocarbon charge be introduced to the conversion chamber in such a manner that none of the liquid comes in contact with heated metal surfaces in the upper portion of the conversion chamber since said metal surfaces exist at a temperature high enough to cause, upon contact by the liquid hydrocarbon charge, rapid conversion of said charge. The result of this rapid conversion is the formation of coke on the hot tubes and metal sections of the conversion chamber. This coke eventually breaks off from the metal surfaces in large pieces which pass downwardly through the conversion chamber and plug up restricted passages for contact material flow near the lower end of the conversion chamber and in other portions of the system.

Recently methods have been proposed for supplying liquid hydrocarbons and catalyst onto the bed in conversion zones wherein the catalyst is showered downwardly through an upper gas space onto the bed while liquid feed is sprayed onto the showering catalyst or downwardly within a falling curtain thereof. This invention is an improvement in a method and apparatus of this latter type. In the method and apparatus of this invention contact material is showered downwardly onto the upper surface of a substantially compact bed of granular contact material as a central continuous curtain of horizontal cross-sectional area only a minor fraction of the horizontal cross-sectional area of said bed at its upper end. A high boiling liquid hydrocarbon charge is sprayed downwardly from a point within the curtain onto about the same area of the upper surface of the column on which the curtain falls. Contact material granules from the curtain strike the upper surface of the column and rebound and are thereby mixed uniformly with the liquid charge.

A major object of this invention is the provision, in a system for the conversion of liquid or mixed phase hydrocarbons in the presence of a substantially compact moving bed of granular contact material, of a method and apparatus for the introduction of the hydrocarbon charge and contact material to the conversion zone which avoids the difficulties described hereinabove.

A specific object of this invention is the provision in a continuous cyclic process for conversion of high boiling liquid or mixed phase hydrocarbons to lower boiling gaseous hydrocarbons of a method and apparatus which distributes the hydrocarbon charge uniformly over the surface of the contact material column in the conversion zone without excessive accumulation of coky deposits upon metal surfaces within said zone.

These and other objects of this invention will become apparent in the following discussion of the invention and the drawings attached hereto, of which.

All of these drawings are highly diagrammatic in form.

Figures 1, 3, 4:
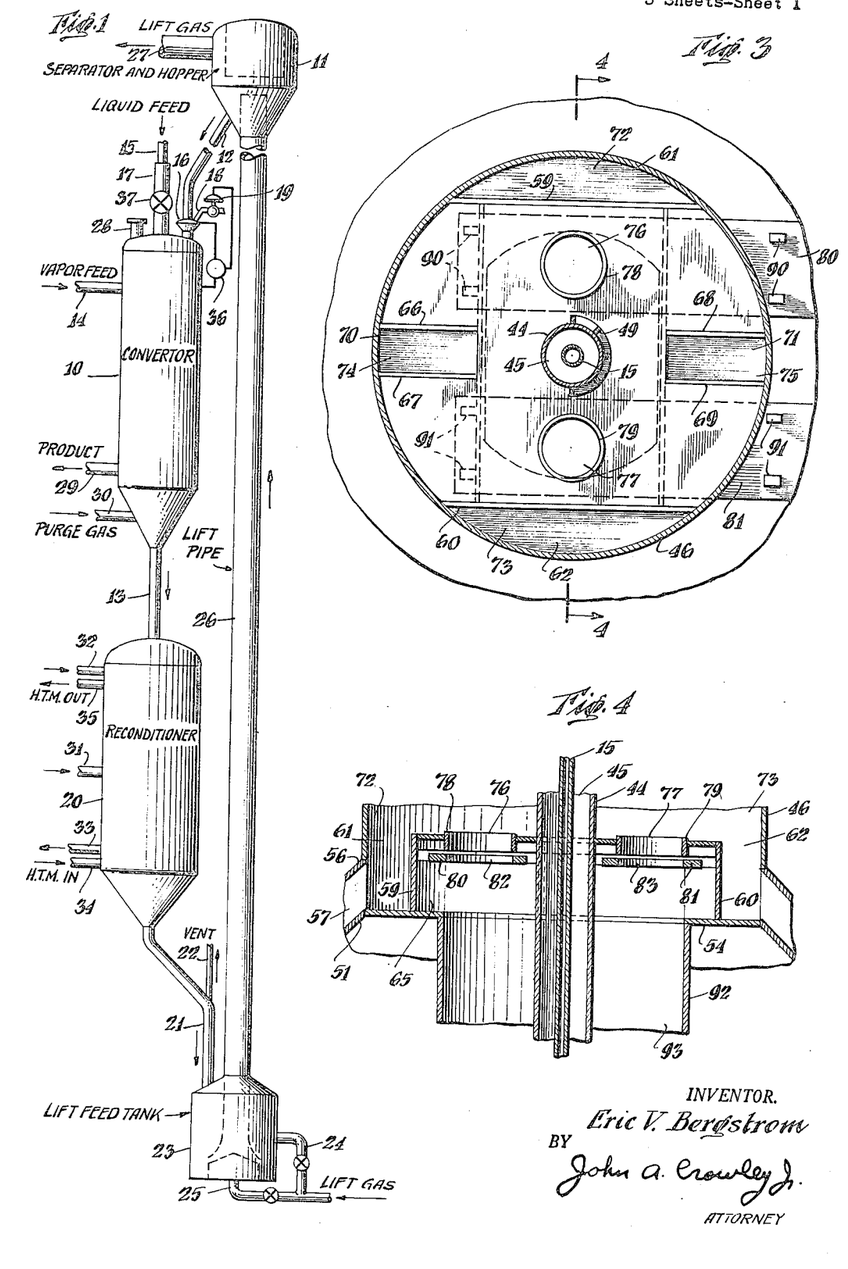
Figure 1 is an elevational view showing the general arrangement of a continuous hydrocarbon conversion system of the type to which this invention may be applied.
Figure 3 is a sectional view taken along line 3—3 of Figure 2.
Figure 4 is a sectional view taken along line 4—4 of Figure 3.

Turning now to Figure 1, there is shown a conversion vessel 10 positioned vertically above a reconditioner 20, the bottom of vessel 10 being connected to the top of vessel 20 by means of a conduit 13. Gravity feed leg 21 extends from the lower end of reconditioner 20 downwardly into lift feed tank 23 therebelow and is vented by means of conduit 22. Extending upwardly from the lower section of tank 23 is lift pipe 26. Lift pipe 26 terminates within separator 11, positioned at a level above vessel 10, at a point intermediate the upper and lower ends of separator 11. Separator 11 also acts as a hopper for the storage of contact material. Gravity feed leg 12 extends from the lower section of vessel 11 into the upper section of vessel 10. A seal chamber 16 is positioned on feed bag 12.

In operation contact material at a temperature suitable for the desired conversion flows downwardly from hopper 11 into the upper section of vessel 10. An inert seal gas, such as steam or flue gas, may be admitted to seal chamber 16 through conduit 18 at a rate controlled by diaphragm valve 19 which is operated by differential pressure controller 36 to maintain a pressure within chamber 16 above that in the conversion chamber within vessel 10. Seal gas passes into the upper section of vessel 10 with the contact material. Contact material passes through converter 10 as a downwardly gravitating substantially compact column. A liquid hydrocarbon charge may be admitted to vessel 10 by means of central vertical conduit 15 and vaporized hydrocarbon charge may be simultaneously admitted to the vessel by means of conduit 14. Hydrocarbon charge passes downwardly through the compact column of contact material within vessel 10 and is converted to lower boiling hydrocarbon products which may contain high percentages of gasoline and fuel oil. Products are disengaged from the column by means of any of a number of suitable arrangements such as those shown in Simpson et al., U. S. Patent No. 2,336,041, Bergstrom, U. S. Patent No. 2,458,498 and Fahnestock, U. S. Patent No. 2,362,621. The disengaged products are withdrawn from vessel 10 by means of conduit 29. Baffles adapted to withdraw used contact material uniformly from the horizontal cross-section of vessel 10 may also be provided in the lower section of vessel 10. Such baffles are shown in Evans et al., U. S. Patent No. 2,412,136. Used contact material is purged with a suitable inert gas such as steam or flue gas admitted through conduit 30 and transferred to the upper section of reconditioner 20 by means of conduit 13. If the process is one, such as catalytic cracking, in which a substantial amount of carbonaceous contaminant is deposited on the used contact material, the reconditioner will take the form of a catalyst regenerator. Air to burn off the contaminant is introduced through conduit 31. Flue gas is withdrawn by means of conduits 32 and 33. In order to prevent overheating of the contact material to damaging levels, cooling tubes (not shown) may be provided within the reconditioner. These tubes may be supplied with a suitable cooling medium through conduit 34. Cooling fluid may be withdrawn from the cooling tubes by means of conduit 35. If the process involved is a non-catalytic process, for example, wherein the amount of coke deposit is negligible or if it be a process in which the amount of carbonaceous deposit is insufficient upon combustion to heat the contact material to the desired inlet temperature to the converter, the reconditioner 20 may take the form of an apparatus the principal function of which is to heat the contact material. Other regenerator constructions than that shown and described hereinabove are contemplated within the scope of this invention. Contact material passes from reconditioner 20 through gravity feed leg 21 into gas lift feed tank 23. In this tank contact material is thoroughly mixed with inert lift gas such as steam, flue gas, nitrogen, etc. supplied through conduits 24 and 25. The lift feed tank may be of any of the constructions well known to those skilled in the art. The lift gas transports the catalyst up lift feed pipe 26 to hopper 11 where the lift gas is removed through conduit 27.

The best understanding of the apparatus within the upper portion of the converter will be had by studying Figures 2, 3, 4, 5 and 6 together. Like parts in all of these figures and Figure 1 bear the same numerals. Conduit 17 extends upwardly from the center of the upper end of vessel 10 and has gate valve 37 positioned thereon intermediate its upper and lower ends. A stuffing box 38 is provided at the upper end of conduit 17 through which liquid feed pipe 15 may pass into the upper section of vessel 10. A spray nozzle 39 is attached to the lower end of pipe 15. Conduit 17 should be sufficient in internal horizontal cross-sectional area to permit the free passage of spray nozzle 39 and pipe 15 therethrough. A suitable support member 40 with vertically adjustable angle piece 41 extends upwardly from the upper end of conduit 17 while pipe 15 has a stop, protuberance or flange 42 fixed thereon at an appropriate position so that the lower end of said pipe may be adjusted to any one of a number of different positions above contact material column 43 within vessel 10. A sleeve 44 fits loosely about pipe 15 and extends from a point just below the upper end of vessel 10 to a point shortly above nozzle 39. Sleeve 44 is of such a horizontal cross-sectional area that spray nozzle 39 will pass freely therethrough, thereby providing an annular space 45 between pipe 15 and the inner wall of sleeve 44. It should be noted this apparatus provided a system whereby liquid feed pipe 15 and nozzle 39 may be withdrawn from vessel 10 at any time without completely shutting down operations within the vessel. Pipe 15 is simply moved upwardly until nozzle 39 is in the upper section of conduit 17 above valve 37. Valve 37 is then closed and stuffing box 38, pipe 15 and nozzle 39 removed from conduit 17. A receptacle 46 of horizontal cross-sectional area substantially less than the horizontal cross-sectional area of vessel 10 is fitted about the upper section of sleeve 44 with the open end of the receptacle below the upper end of the sleeve so as to define a space 47 for contact material accumulation. The bottom of receptacle 46 is fastened tightly to the outside of sleeve 44. Feed leg 12 passes into the upper section of vessel 10 and terminates at a point such that contact material from 12 will be discharged into space 47 within receptacle 46. An erosion grating 48 is provided within the bottom of 12 over that portion of the length of 12 which is not substantially vertical within vessel 10 to prevent damage to 12 by flowing contact material. An erosion grating 49 is also provided on the outside of sleeve 44 for a similar reason. A second conduit 28 extends into the upper end of vessel 10 and terminates within receptacle 46 so that vessel 10 may be refilled with contact material if the system has been drained. In normal operation this conduit is closed off by blind flange 50 or by means of a valve or seal and feeding device. An upright frusto-conical partition 51 of the same upper diameter as receptacle 46 extends across vessel 10 so as to define a seal chamber 52 above partition 51 in the upper end of vessel 10. The lower end of partition 51 is supported by annular ring 53 attached to the inner periphery of vessel 10 at such a level that the upper end of 51 terminates at a level a fixed vertical distance below the bottom of receptacle 46. A horizontal circular partition 54 extends inwardly from the upper end of partition 51 and has an opening 55 at its center of substantially larger cross-sectional area than sleeve 44 through which the sleeve passes. A second frusto-conical partition 56 is fixed a spaced distance above said first named frusto-conical partition 51 and extending downwardly to a point adjacent to but not in contact with the inner periphery of vessel 10 so as to define a frusto-conical passageway 57 for contact material flow. Supports 58 are provided at the lower end of partition 56. From a study of Figure 5 it will be seen that a plurality of partitions extend upwardly from horizontal partition 54 and attach to the bottom of receptacle 46. Parallel partitions 59 and 60 extend across partition 54 on opposite sides of central opening 55 so as to define passageways 61 and 62 in the shape of circular segments on the outer sides of partitions 59 and 60, passageways 61 and 62 being in communication with frusto-conical passageway 57. Parallel partitions 63 and 64, perpendicular to partitions 59 and 60 extend across horizontal partition 54 on opposite sides of opening 55 and abut partitions 59 and 60 on their opposite ends so as to define a central rectangular passageway 65 in communication with opening 55. Partitions 66 and 67, and 68 and 69, extend laterally inwardly from the outer edge of partition 54 and abut partitions 63 and 64 respectively to form rectangular passageways 70 and 71 on opposite sides of partition 54 and 90° removed horizontally from passageways 61 and 62. Passageways 70 and 71 communicate at their outer ends with frusto-conical passageway 57. Openings are provided in the bottom of receptacle 46 to communicate with the various passageways on partition 54. These openings are most easily seen in Figures 3 and 4. Thus, opening 72 communicates with passageway 61, opening 73 with passageway 62, opening 74 with passage 70 and opening 75 with passageway 71. All of these openings are of the same size and shape as the passageways with which they communicate. Two circular openings 76 and 77 are provided near the center of the bottom of receptacle 46 on opposite sides of sleeve 44 so as to communicate with central passageway 65 on partition 54. These orifices are fitted with nipples 78 and 79. Horizontal, spaced apart slide valve plates 80 and 81 extend beneath nipples 78 and 79, respectively, and have circular openings 82 and 83 of about the same diameter as nipples 78 and 79, respectively, appropriately placed thereon so that 82 and 83 may be aligned with 78 and 79. Suitable openings (not shown) are provided in partitions 63 and 64 for the passage of plates 80 and 81 therethrough. Returning to Figure 2, plates 80 and 81 are joined at their outer ends within seal zone 52 and by a solid bar 84. Attached to bar 84 is a shaft 85 which extends through the wall of vessel 10 by means of stuffing box 86 to the exterior of the vessel. Connected to the outer end of shaft 85 is an operating mechanism 87 which may consist of any mechanism suitable to move the slide valve mechanism inwardly and outwardly to open and close communication between receptacle 46 and passageway 65 through nipples 78 and 79. Operating mechanism 87 is supported by platform 88 and brace 89. Stops 90 and 91 are appropriately positioned on plates 80 and 81, respectively, so that the flow of contact material through nipples 78 and 79 may be completely opened or closed by pushing the slide valve to its maximum position inwardly or outwardly. It should be noted that all portions of the slide valve mechanism which lie within vessel 10 are in seal chamber 52 wherein a blanket of inert seal gas is maintained around the slide valve to protect it from contact with hydrocarbons which might result in coke formations on the slide valve and impairment of its operation. Extending downwardly centrally from the underside of partition 54 beneath opening 55 is cylinder 92. Cylinder 92 is of greater cross-sectional area than opening 55 and fitted about sleeve 44 to form an annular chamber or passageway 93 for contact material. The lower end of passageway 93 is closed off by flange or plate 94 which fits tightly about sleeve 44 passing therethrough. A plurality of orifices 95 penetrate flange 94 in a circular pattern at spaced apart points near the outer periphery of chamber 93. A partition consisting of two sections 96 and 97 extends horizontally across vessel 10 so as to define a plenum chamber 98 above said partition and below partition 51 and a convention chamber 99 therebelow. The details of this partition and the bottom of passageway 93 are best understood by referring to Figure 6 in connection with Figure 2. The central portion 96 of the partition extends downwardly from flange 94 as an upright cylinder of substantially greater diameter than sleeve 44 but of less diameter than that of the circular pattern of orifices 95. Partition section 96 flares outwardly until it becomes substantially horizontal on its outer end. Partition section 97 is in the form of an annular plate with inside diameter preferably but not necessarily slightly greater than the diameter of section 96 at its lower end so that a continuous annular opening 100 between sections 96 and 97 is formed. Section 97 lies in a horizontal plane a spaced distance below the lower end of section 96 and has an outside diameter slightly less than the inside diameter of vessel 10. Section 97 is supported on its outer edge by annular support member 101 attached to the inner wall of vessel 10 and is supported on its inner edge by a plurality of support members 102 attached to section 96. If desired, plate 97 may be omitted from vessel 10 in modifications of this invention. Support members 103 are spaced around the upper side of section 96 to prevent warping. The members or vertical vanes 103 also serve to provide a plurality of separate radially arranged passages 200 for contact material flow from the orifices 95 to the annular opening 100. An upright cylindrical member 104 of diameter greater than the inside diameter of section 97 is fixed centrally on section 97 to prevent contact material from passing to that portion of section 97 not enclosed within cylinder 104. A continuous annular opening 105 passes through partition section 97 immediately beyond cylinder 104. A plurality of spaced apart orifices 106 pass through that area of section 97 beyond cylinder 104. Vaporized hydrocarbon charge port 14 extends into plenum chamber 98. A baffle 107 for dispersal of the vaporized charge through the plenum chamber is fixed in front of conduit 14 and supported by platform 108. A plurality of conduits 109 extend downwardly along a plurality of uniformly spaced apart vertical lines near the inner periphery of vessel 10 from points just above frusto-conical partition 51 to points within conversion chamber 99 at the surface of compact column 43 substantially below the upper end of the conversion chamber. Openings are provided in partition section 97 for the passage of conduits 109, of substantially greater cross-section area than conduits 109 so that annular spaces 110 are provided between the conduits and partition section 97. Conduits 109 are fastened tightly to frusto-conical partition 51 near their upper ends while support members 111 are provided near the lower ends of conduits 109 to maintain the conduits substantially vertical. A concrete lining 112 is provided on the walls of vessel 10 within seal chamber 52 to prevent excessive heat losses from the seal chamber. For the same reason exterior insulation 113 is provided over the remainder of the vessel length.

Figure 2:
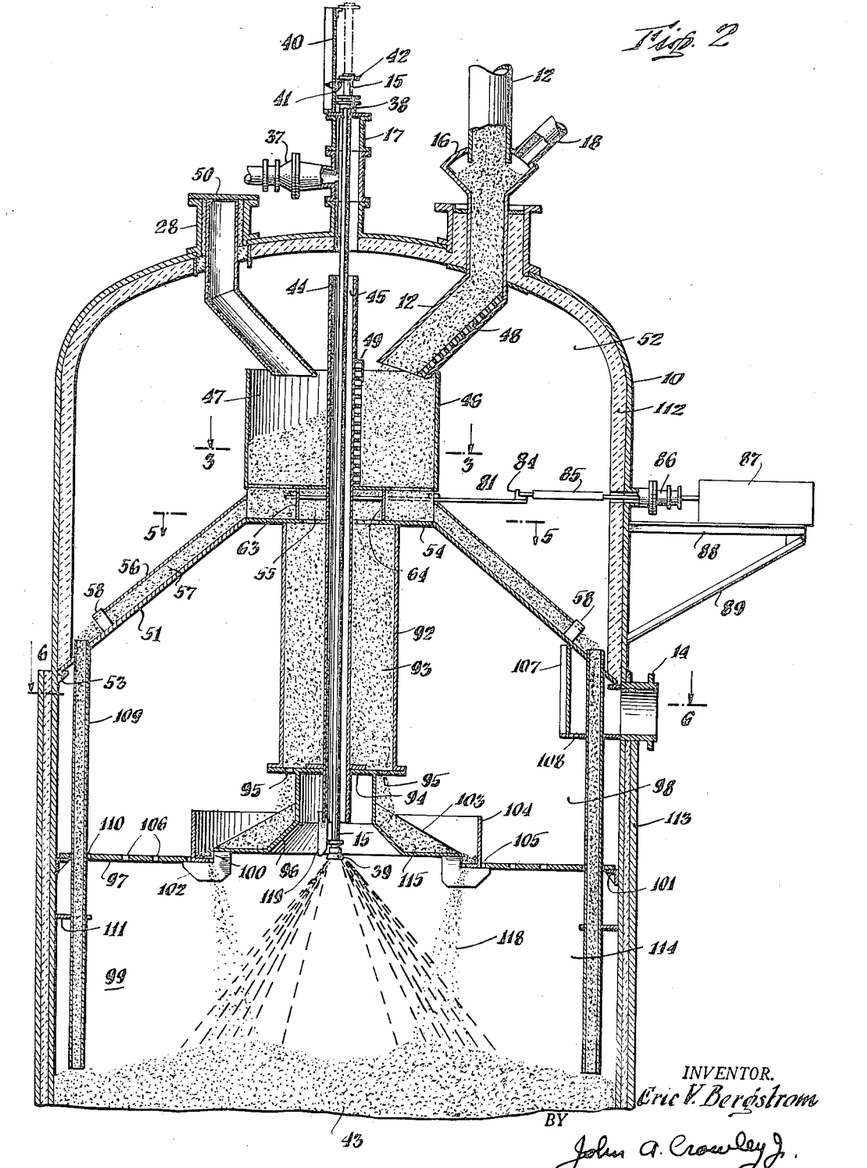
Figure 2 is an elevational view, partially in section, of the upper portion of the conversion vessel showing the application of this invention to the conversion vessel.
Figure 5:
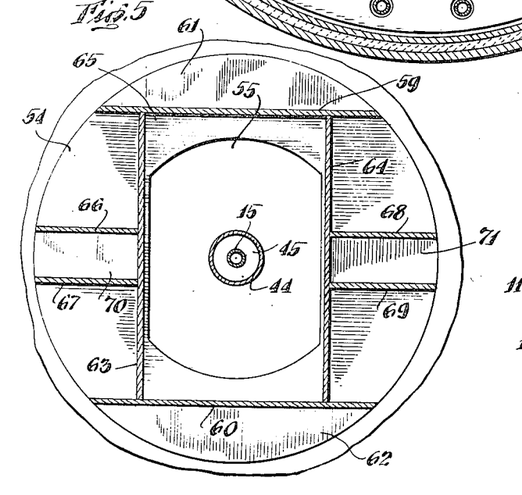
Figure 5 is a sectional view taken along line 5—5 of Figure 2.
Figure 6:
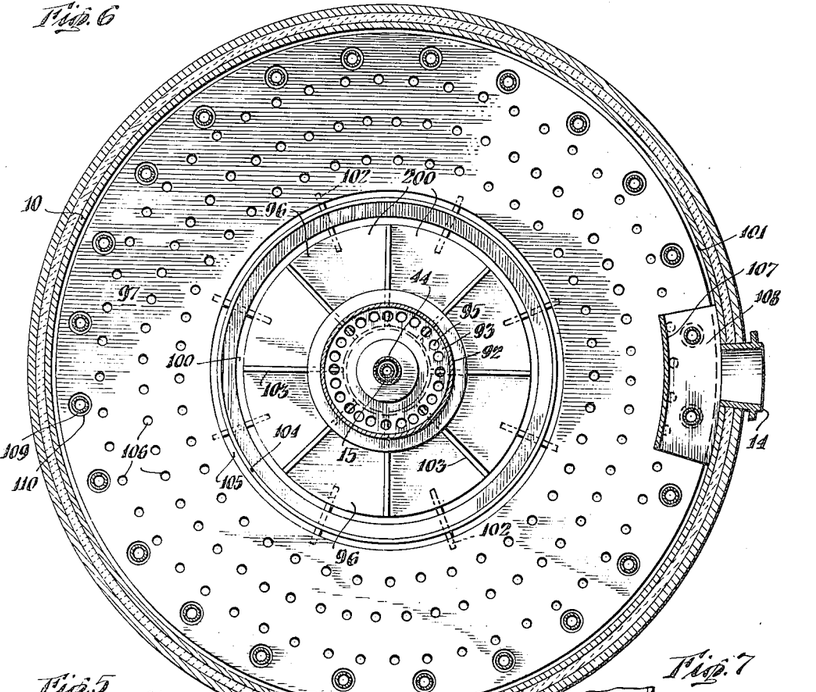
Figure 6 is a sectional view taken along line 6—6 of Figure 2.

In operation contact material enters vessel 10 together with seal gas from seal chamber 16 by means of conduit 12 and is discharged into receptacle 46. Seal gas distributes itself throughout seal chamber 52 within vessel 10. Contact material passes as compact streams from the lower end of receptacle 46 by means of openings 72, 73, 74 and 75 through passageways 61, 62, 70 and 71 into frusto-conical passageway 57. Contact material gravitates as a compact stream through passageway 57 and is transferred from the lower end of 57 by means of conduits 109 to the upper surface of contact material column 43. The flow of contact material through conduits 109 acts to maintain the upper surface of 43 at about the same level beneath the upper end of conversion chamber 99 as that at which conduits 109 terminate since the level of column 43 serves to throttle the flow through conduits 109. Thus a gas space 114 is defined above column 43 in the upper end of conversion chamber 99. With slide valves 80 in the open, normal operating, position contact material also gravitates from receptacle 46 through nipples 78 and 79 into passageway 65. Contact material flows from passageway 65 through opening 55 and downwardly as a compact stream through chamber 92. Contact material is discharged from chamber 92 through orifices 95 and drops as a plurality of freely falling streams onto a stagnant layer of contact material 115 which is maintained on the surface of partition section 96 due to the configuration of section 96. Partition section 96 acts to baffle and disperse the contact material from orifices 95, the contact material passing downwardly over stagnant layer 115 and being discharged from the lower edge of 96 onto the inner edge of 97 from which it passes through annular opening 100 into the upper end of conversion chamber 99. The contact material showers downwardly as a continuous tubular curtain 118 onto an annular area on the upper surface of contact material column 43. The terms annular and tubular as applied to curtain 118, the area on which it falls and the curtain forming arrangement herein are not limited to circular cross-sections but include other cross-sectional shapes such as rectangular, horizontal and the like. The cross-sectional area enclosed by the area on which curtain 118 falls will be less than the cross-sectional area enclosed by annular opening 100 since the contact material is diverted by baffle 104 and the end of section 97 so that it tends to fall inwardly from the annular opening 100. As a result the internal diameter of the curtain or the area of the gas space inside the curtain is greater just below annular opening 100 than it is at the level of the surface of column 43. On the other hand, the cross-sectional area of the curtain 118 is substantially greater at its lower end than at its upper end. Liquid hydrocarbon charge is sprayed by spray nozzle 39, positioned centrally within curtain 118 and a substantial distance above surface of column 43, downwardly and outwardly or tangentially toward the curtain 118. The liquid spray and curtain 118 are directed, prior to contact or mixing, along paths which converge at the column surface and over substantially the same area of the column surface. Since both the liquid spray and the contact material are of substantial horizontal thickness at a level just above the column surface, it is necessary for a portion of the spray to pass through at least a portion of the curtain 118 at a level shortly above the column surface so as to eventually reach that portion of the surface lying outside the area on which curtain 118 falls. In order to obtain proper distribution of liquid and contact material, the density and thickness of the curtain immediately above the column surface and the direction and velocity of the liquid spray should be controlled to cause about 5 to 25 percent by volume of the liquid spray to pass entirely through the curtain shortly above the column surface before reaching the column surface. The liquid should pass through the curtain not more than 8 inches and preferably not more than 5 inches above the nearest surface of the column. The curtain thickness and density may be controlled by control of the rate of contact material delivery to the shower and the diameter of the curtain and the height of material fall from the annular opening 100 to the column surface. The direction of the spray involves the use of a nozzle which will cause the liquid to move downwardly and tangentially toward the curtain and the adjustment of the height of the nozzle above the column surface so that most of the liquid and the granules of the curtain, prior to contact or mixing, are directed along paths which converge at the column surface and over substantially the same area, in the manner discussed hereinabove, while about 5–25 percent of the liquid passes through the curtain shortly above the column surface. Obviously, a substantial amount of the liquid entering the curtain shortly above the column surface will contact falling granules and become deposited thereon.

This system provides for a more uniform distribution of the liquid across the upper surface of column 43 since liquid charge will be carried outwardly and inwardly across the column by contact material granules from curtain 118. Vaporized hydrocarbon charge passes into plenum chamber 98 by means of conduit 14 and passes into the upper end of conversion chamber 99 as a plurality of high velocity streams around curtain 118 by means of annular openings 105 and 110 and orifices 106. These high velocity vapor streams have the effect of forcing any particles of liquid charge which escape through curtain 118 into the outer section of gas space 114 onto the surface of contact material column 43 before the liquid particles contact any of the hot metal parts within the gas space such as conduits 109, and the wall of vessel 10. This downward flow of vapor between the curtain 118 and housing walls counteracts the upward convection currents which would otherwise be created in this space by the falling solid material in the curtain. Spray nozzle 39, pipe 15 and the underside of partition section 96 are shielded from contact with liquid charge by means of inert seal gas which passes into the conversion chamber through annular space 45 from seal chamber 52. The pressure in the seal chamber is maintained slightly above that in the conversion chamber by means of differential pressure controller 36 as described in connection with Figure 1. Annular space 45 also insures that the flow of contact material in curtain 118 is relatively constant since any rise in pressure in conversion chamber 99 will be relieved by means of passageway 45 and not through flow restricting orifices 95 and annular space 100, which would disrupt the contact material flow to curtain 118.

Figure 7:
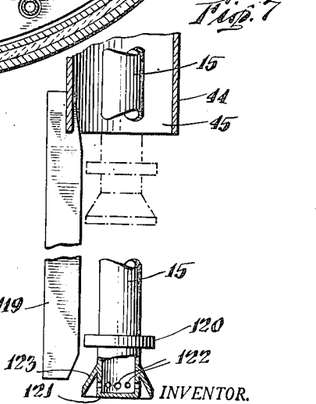
Figure 7 is an elevational view, partially in section, showing details of the spray nozzle assembly and spray nozzle used to introduce liquid hydrocarbons to the converter.

The details of the liquid hydrocarbon spray nozzle assembly and a typical nozzle are shown in Figure 7. The nozzle is provided with a central body portion 121. A plurality of horizontally spaced apart orifices 122 penetrate the side walls of 121 at a level near its lower end. A horizontally continuous impinging plate 123 extends outwardly and downwardly from a level on body 121 above orifices 122 to a level below orifices 122. Three positioning vanes 119 of which only one is shown in Figure 7 are spaced evenly about the nozzle to maintain the nozzle in a fixed vertical plane by bearing on collar 120 on pipe 15. In operation liquid hydrocarbons pass from pipe 15 into nozzle body 121. The liquid is discharged laterally through orifices 122 and deflected downwardly by inclined impinging plate 123 as a conical liquid spray. In another suitable nozzle, orifices 122 are replaced by a continuous slot around body 121. This nozzle gives a more uniform spray than the nozzle described above.

While vessel 10 and corresponding parts in the upper section of the vessel are shown here as being circular in horizontal cross-sectional shape they may, within the scope of this invention, be of any other desired shape such as rectangular, hexagonal, etc. The exact dimensions of the several elements of the improved apparatus described hereinabove will, of course, be dependent to a large extent upon the particular operation and operating conditions involved. In general it is desirable that gas space 114 above column 43 have a vertical height of from 1 ft. to 8 ft. It is further desirable that curtain 118 enclose only a minor fraction of the horizontal cross-sectional area of vessel 10. Thus the horizontal cross-sectional area within curtain 118 measured adjacent to the surface of the contact material column should be within the range 1% to 25% and preferably within the range 1% to 15% of the total horizontal cross-sectional area of the gas space above column 43.

The conditions of operation in the apparatus of this invention will also vary widely depending upon the particular operational application involved. In general, the contact material should be supplied at a temperature suitable to support the conversion desired. In the case of catalytic cracking operations the temperature may be of the order of about 800° F. to 1200° F. while in the case of thermal cracking operations over inert contact materials, the contact material temperature may be much higher. While broadly there is no limitation on the amount of contact material which passes through annular space 100 and falls in curtain 118, preferably this amount should be in the order of 65 to 95 percent of the total contact material. The invention may be employed for the conversion of hydrocarbon charge stocks which are partially vaporizable under the conversion conditions or it may be employed for the conversion of reduced crudes and the like which consist for the most part of hydrocarbons boiling above the desired average conversion temperature. It is usually preferable to heat the hydrocarbon charge to a temperature of the order of 600° F. to 900° F. before introducing it into the conversion chamber. It is also desirable that the amount of the liquid charge which passes completely through the curtain be maintained as low as possible consistent with proper liquid-catalyst distribution in order to minimize the possibility of the liquid contacting hot metal parts in the upper section of the conversion chamber. Preferably, no more than 5 percent to 25 percent of the liquid charge should penetrate the curtain completely.

As an example of the operation of this invention a cylindrical catalytic cracking reactor having a diameter of 16 feet will be considered. Receptacle 46 had a diameter of 5 feet 4 inches while cylinder 92 therebelow had a diameter of 3 feet 2 inches. The contact material flow rate through the vessel was 372 tons/hour. The diameter of annular opening 100 was 7 feet but the diameter of the area enclosed by curtain 118 adjacent to the surface of the column was only 5 feet 6 inches due to the baffling of the contact material curtain inwardly by striking on partition section 97. There were 24 conduits 109 extending into conversion chamber 99 a distance of 5 feet 10 inches. About 80 percent of the total contact material flow occurred through annular opening 100.

It should be understood that this invention covers all changes and modifications of the example of the invention chosen for purposes of disclosure, which do not constitute departures from the spirit and scope of the invention.

I claim:

1. In a process for the conversion of liquid hydrocarbons in the presence of a moving mass of granular contact material wherein contact material at a temperature suitable to effect the desired conversion is supplied to the upper surface of the contact material mass as a tubular curtain of contact material which falls onto an annular-shaped area of the upper surface of said mass, said curtain enclosing about 1 to 15 percent of the area of said upper surface, and wherein liquid hydrocarbon charge is sprayed downwardly toward said surface from a point within said curtain, the improvement which comprises: directing the spray of liquid hydrocarbon charge along a path which converges with the path of said curtain at the surface of said mass so that a preponderant portion of the liquid charge strikes the same area of the upper surface of said mass as the contact material from the falling curtain, with no more than 5 to 25 per cent of the liquid charge penetrating the curtain completely and that penetration occurring no more than 8 inches above the surface of the mass.

2. An apparatus for the conversion of high boiling liquid hydrocarbon feed to lower boiling gaseous hydrocarbon products in the presence of a substantially compact moving column of granular contact material which comprises in combination: a substantially vertical vessel, a receptacle open on its upper end positioned centrally within the upper section of said vessel, a transverse partition extending across said vessel beneath said receptacle so as to define a seal chamber in the upper section of said vessel above said partition, said partition being substantially horizontal in that portion of the horzontal cross-sectional area beneath said receptacle and in the shape of an upright frustum of a cone over the remainder of its area, means for introducing seal gas into said seal chamber, means for introducing contact material into said receptacle, substantially vertical partitions forming a valve box centrally beneath said receptacle, the upper ends of said vertical partitions being attached to the bottom of said receptacle and the lower ends of said vertical partitions being attached to said transverse partition, members defining passages below said receptacle and spaced around the outside of said valve box attached on their upper ends to the bottom of said receptacle and on their lower ends to said partition and being open on their outer sides toward the walls of said vessel, openings in the bottom of said receptacle communicating with said passages, at least one opening in the bottom of said receptacle communicating with said valve box, a slide valve extending movably through said valve box beneath said last named opening adapted to open and close said last named opening, a shaft connected to the outer end of said slide valve, a stuffing box extending through the wall of said vessel for the passage of said shaft to the exterior of said vessel, a plurality of substantially vertical conduits depending downwardly from said transverse partition near the outer periphery of said transverse partition to an intermediate level within said vessel spaced a substantial distance below said transverse partition, members defining a centrally disposed annular passage beneath said valve box and below said transverse partition but above the lower ends of said plurality of conduits, an opening in said transverse partition communicating said valve box with said annular passage, a downwardly facing liquid spray device below said annular passage disposed laterally and centrally thereof above the lower ends of said conduits and means to supply liquid oil feed to said spray device.

3. An apparatus for the conversion of high boiling liquid hydrocarbons to lower boiling gaseous hydrocarbons in the presence of a substantially compact moving column of granular contact material which comprises in combination: an upright, substantially vertical conversion chamber adapted to confine a substantially compact column of granular contact material, a seal chamber positioned above said conversion chamber, means for introducing an inert seal gas into said seal chamber, a receptacle for contact material open on its upper end positioned centrally within said seal chamber and of substantially less cross-sectional area than said seal chamber, means for introducing contact material at a temperature suitable for the conversion into said receptacle, a continuous passageway for the flow of contact material extending downwardly and outwardly from the lower section of said receptacle to the periphery of said seal chamber, a plurality of uniformly spaced conduits for the passage of contact material extending downwardly from said continuous passageway and extending a substantial vertical distance into said conversion chamber along the inner periphery of said conversion chamber and terminating on their lower ends a substantial distance below the upper end of said conversion chamber, a central confined passageway for the flow of contact material extending substantially vertically downwardly from the lower end of said receptacle into said conversion chamber and terminating a substantial distance below the upper end thereof and a substantial distance above the lower ends of said conduits, a plurality of orifices extending through the bottom of said receptacle and communicating with said central passageway, a slide valve consisting of at least one flat plate having orifices of about the same cross-sectional area as the orifices in said receptacle and capable of being adjusted so that the orifices in said receptacle and the orifices in said slide valve will align and contact material will pass from said receptacle into said central passageway, a stuffing box in the wall of said seal chamber, a shaft extending through said wall and connecting to said slide valve whereby said slide valve may be operated from the exterior of said seal chamber to open and close communication between said receptacle and said central passageway, a closing plate across the lower end of said central passageway having a plurality of orifices spaced apart in a circular pattern whereby the flow of contact material from said central passageway will be throttled, a central continuous baffle fixed beneath said central passageway adapted to receive contact material flowing from said passageway and deflect it radially outwardly to the outer edges of said baffle, which edges are substantially inward from the walls of said conversion chamber, baffle members adjacent the outer edges of said central baffle forming therewith an annular opening for passage of the contact material to the portion of the chamber therebelow as a continuous tubular curtain, a liquid spray device positioned within said conversion chamber below said central baffle and above the ends of said conduits and disposed laterally centrally with respect to said annular opening, means for supplying high boiling liquid hydrocarbon charge to said spray device, means for removing gaseous materials from the conversion chamber, and means for removing contact material from the lower section of said column.

4. An apparatus for the conversion of high boiling fluid hydrocarbons to lower boiling gaseous hydrocarbons in the presence of a substantially compact moving column of granular contact material which comprises in combination: a substantially vertical elongated vessel, a receptacle, open on top, adapted to confine an accumulation of contact material centrally positioned within the upper section of said vessel, said receptacle being of smaller lateral dimensions than said vessel, a conduit for the passage of contact material extending into the upper section of said vessel and terminating within said receptacle, an upwardly tapered symmetrical partition extending upwardly from the walls of said vessel to a location below and approximately in line with the projected periphery of said receptacle, members connecting the inner edge of said tapered partition to the bottom of said receptacle, said members being connected to said receptacle at points intermediate its center and periphery so as to define a central vertical passageway from the central portion of the bottom of said receptacle to the portion of the vessel therebelow and an outer passageway from the outer portion of the bottom of said receptacle onto said tapered partition, at least one opening in the bottom of said receptacle communicating with said central passageway and a plurality of openings in the bottom of said receptacle communicating with said outer passageway, means for supplying steam to said vessel at a location above said partition, a substantially vertical conduit connected at its upper end to said connecting members so as to communicate and receive contact material from said central vertical passageway and terminating on its lower end in the upper section of said vessel a spaced distance below said tapered partition, means for throttling the flow of contact material from said conduit at the lower end of said conduit, a second partition extending transversely across said vessel a vertical distance below the lower end of said conduit so as to divide the vessel into a plenum chamber above said second partition and below said first partition and a conversion chamber therebelow, an annular opening in said second partition through which contact material may pass into said conversion chamber as a continuous tubular curtain, a plurality of spaced apart orifices in said last named partition at positions further removed from the center of said vessel than said annular opening, a plurality of substantially vertical pipes for the passage of contact material depending from a plurality of points around said first partition near its outer periphery and extending downwardly through said plenum chamber and terminating a substantial vertical distance within said conversion chamber below said annular opening, a vertical sleeve extending through said receptacle, central passageway and vertical conduit, said sleeve terminating on its open upper end above said receptacle and below the upper end of said vessel and terminating on its lower end substantially below said vertical conduit and above the lower end of said pipes which depend from said first partition, a vertical conduit extending centrally upwardly from the upper end of said vessel having a valve intermediate its upper and lower ends and a stuffing box closing off its upper end, a substantially vertical liquid hydrocarbon charge pipe extending downwardly through said stuffing box and loosely through said sleeve and terminating below the lower end of said sleeve but above the lower end of said pipes, a spray nozzle attached to the lower end of said pipe, a vapor inlet port extending into said plenum chamber, means for removing gaseous material from the lower section of said conversion chamber and means for removing contact material from the lower section of said column.

5. An apparatus for the conversion of high boiling fluid hydrocarbons to lower boiling gaseous hydrocarbons in the presence of a substantially compact moving column of granular contact material which comprises in combination: an upright vessel, adapted to maintain a substantially compact column of granular contact material in its lower section, a conduit extending upwardly from the center of the upper end of said vessel, a valve intermediate the upper and lower ends of said conduit capable of closing off the upper end of said conduit from communication with said vessel, a stuffing box at the upper end of said conduit, a liquid hydrocarbon charge pipe extending vertically and slidably through said stuffing box and said conduit along the center line of said vessel to a level substantially below the lower end of said vessel, a spray nozzle fixed to the lower end of said pipe, a sleeve fitted annularly about said pipe from a point immediately below the upper end of said vessel to a point shortly above said spray nozzle said sleeve having a greater horizontal cross-sectional area than said spray nozzle whereby said pipe and said spray nozzle may be removed from said vessel, a cylindrical receptacle open at its upper end fixed annularly about the upper section of said sleeve with the bottom of said receptacle tightly attached to said sleeve so as to define an annular space for contact material accumulation, a contact material charge conduit extending into the upper section of said vessel and terminating within said receptacle, an upwardly pointing frusto-conical partition with upper diameter equal to the outside diameter of said receptacle extending outwardly to the walls of said vessel from a vertical level immediately below said receptacle, a second upwardly pointing frusto-conical partition spaced above said first named frusto-conical partition having an upper diameter equal to the diameter of said receptacle and extending downwardly to a level adjacent to and short of the walls of said vessel whereby a frusto-conical passageway for contact material flow is defined between said two partitions, openings in the bottom of said receptacle near the outer edge of said bottom at least one such opening being in each quadrant of the circular cross-section of said bottom, members defining passageways open to said frusto-conical passageway situated beneath each of said openings tightly attached to the bottom of said receptacle on their upper ends and to said first frusto-conical partition on their lower outer edge whereby a seal chamber is formed above said first frusto-conical partition and said passage defining members in the upper end of said vessel, means for introducing seal gas to said seal chamber, an annular chamber fixed about said sleeve beneath said receptacle, a central passageway from the bottom of said receptacle to said chamber, two orifices in the bottom of said receptacle on opposite sides of said sleeve near the center of the bottom of said receptacle, said orifices communicating with the last named passageway, a partition extending across said vessel beneath said annular chamber and above said spray nozzle, and dividing said vessel into a plenum chamber above said partition and below said frusto-conical partition and a conversion chamber below said partition, openings in the bottom of said annular chamber adapted to pass contact material onto the surface of said partition, a continuous annular opening in said partition adapted to pass contact material into the upper end of said conversion chamber as a continuous curtain, an inlet port for vaporized hydrocarbon charge extending into said plenum chamber, a plurality of openings for passage of vapor from said plenum chamber into said conversion chamber in said last named partition at points further removed from the center of said vessel than said annular opening, a plurality of conduits for contact material flow extending from said frusto-conical passageway through said plenum chamber and into said conversion chamber and terminating at the upper surface of said contact material column, means for removing gaseous material from the lower section of said conversion chamber and means for removing contact material from the lower section of said column.

6. An apparatus for the conversion of high boiling liquid hydrocarbons to lower boiling gaseous hydrocarbons in the presence of a substantially compact moving column of granular contact material which comprises in combination: an upright, substantially vertical conversion chamber adapted to confine a substantially compact column of granular contact material, a seal chamber positioned above said conversion chamber, means for introducing an inert seal gas into said seal chamber, a receptacle for contact material open on its upper end positioned centrally within said seal chamber and of substantially less cross-sectional area than said seal chamber, means for introducing contact material at a temperature suitable for the conversion into said receptacle, a continuous passageway for the flow of contact material extending downwardly and outwardly from the lower section of said receptacle to the periphery of said seal chamber, a plurality of uniformly spaced conduits for the passage of contact material extending downwardly from said continuous passageway and extending a substantial vertical distance into said conversion chamber along the inner periphery of said conversion chamber and terminating on their lower ends a substantial distance below the upper end of said conversion chamber, a central confined passageway for the flow of contact material extending substantially vertically downwardly from the lower end of said receptacle into said conversion chamber and terminating a substantial distance below the upper end thereof and a substantial distance above the lower ends of said conduits, a plurality of orifices extending through the bottom of said receptacle and communicating with said central passageway, a slide valve consisting of at least one flat plate having orifices of about the same cross-sectional area as the orifices in said receptacle and capable of being adjusted so that the orifices in said receptacle and the orifices in said slide valve will align and contact material will pass from said receptacle into said central passageway, a stuffing box in the wall of said seal chamber, a shaft extending through said wall and connecting to said slide valve whereby said slide valve may be operated from the exterior of said seal chamber to open and close communication between said receptacle and said central passageway, a closing plate across the lower end of said central passageway having a plurality of orifices spaced apart in a circular pattern whereby the flow of contact material from said central passageway will be throttled, a central continuous baffle fixed beneath said central passageway adapted to receive contact material flowing from said passageway and deflect it radially outwardly to the outer edges of said baffle, which edges are substantially inward from the walls of said conversion chamber, baffle members adjacent the outer edges of said central baffle forming therewith an annular opening for passage of the contact material to the portion of the chamber therebelow as a continuous tubular curtain, a vertical sleeve extending through said receptacle and said central passageway, said sleeve terminating on its open upper end above said receptacle and below the upper end of said vessel and terminating on its lower end below said first-named baffle but above the lower ends of said plurality of conduits, a vertical conduit extending centrally upwardly from the upper end of said seal chamber and having a valve intermediate its upper and lower ends and a stuffing box closing off its upper end, a substantially vertical liquid hydrocarbon charge pipe extending downwardly through said last-named stuffing box and loosely through said sleeve and terminating at a level below the lower end of said sleeve but above the lower ends of said plurality of conduits, a spray nozzle attached to the lower end of said pipe, means for removing gaseous products from the lower section of said conversion chamber and means for removing granular solids from the lower section of said conversion chamber.

7. An apparatus capable of conducting hydrocarbon conversions in the presence of a moving mass of granular contact material in which at least a portion of the hydrocarbon charge is supplied as a liquid, which comprises in combination: a conversion chamber; means to supply contact material to the upper section of said chamber and means for removing contact material from the lower section thereof; a substantially vertical conduit extending upwardly from the upper end of said chamber and having its lower end in open communication with the interior of said chamber; a valve situated intermediate the upper and lower ends of said conduit and exterior to said chamber, capable of closing off the upper section of said conduit from the lower section thereof and from said chamber; a removable stuffing box at the upper end of said conduit; a substantially vertical hydrocarbon charge pipe extending slidably through said stuffing box, of sufficient length that it may be lowered through said conduit a substantial distance into said chamber; a spray nozzle fixed to the lower end of said pipe; means to supply liquid hydrocarbon charge to said pipe; means to remove products of conversion from said chamber, whereby said nozzle and said pipe may be withdrawn from said chamber while said chamber is maintained in operation under pressure by raising said pipe and nozzle upwardly into the upper section of said conduit and then closing said valve and removing said stuffing box and said pipe and said nozzle from said conduit.

8. An apparatus capable of conducting hydrocarbon conversions in the presence of a moving mass of granular contact material in which at least a portion of the hydrocarbon charge is supplied as a liquid, which comprises in combination: a conversion chamber; means to supply contact material to the upper section of said chamber and means for removing contact material from the lower section thereof; a substantially vertical conduit extending upwardly from the upper end of said chamber and having its lower end in open communication with the interior of said chamber; a valve situated intermediate the upper and lower ends of said conduit and exterior to said chamber, capable of closing off the upper section of said conduit from the lower section thereof and from said chamber; a removable stuffing box at the upper end of said conduit; a substantially vertical hydrocarbon charge pipe extending slidably through said stuffing box, of sufficient length that it may be lowered through said conduit a substantial distance into said chamber; a spray nozzle fixed to the lower end of said pipe; a substantially vertical sleeve situated within the upper section of said vessel directly beneath the lower end of said conduit, whereby as said pipe and nozzle are lowered into said chamber from said conduit they enter said sleeve and pass downwardly therethrough, said sleeve being of such a length relative to said pipe that said nozzle may be positioned beneath the lower end of said sleeve and said sleeve acting to maintain said pipe out of direct communication with the contact material; means to maintain an inert gas atmosphere within said sleeve; means to supply liquid hydrocarbon charge to said pipe; means to remove products of conversion from said chamber, whereby said nozzle and said pipe may be withdrawn from said chamber while said chamber is maintained in operation under pressure by raising said pipe and nozzle upwardly through said sleeve into the upper section of said conduit and then closing said valve and removing said stuffing box and said pipe and said nozzle from said conduit.

References Cited in the file of this patent

UNITED STATES PATENTS

| | | |
|---|---|---|
| 2,446,986 | Simpson | Aug. 10, 1948 |
| 2,492,998 | Lassiat | Jan. 3, 1950 |
| 2,548,912 | Savage | Apr. 17, 1951 |
| 2,561,420 | Schutte | July 24, 1951 |
| 2,574,489 | Lassiat et al. | Nov. 13, 1951 |
| 2,574,850 | Utterback et al. | Nov. 13, 1951 |
| 2,636,805 | Lassiat et al. | Apr. 28, 1953 |